(12) United States Patent
Moran et al.

(10) Patent No.: US 8,307,063 B2
(45) Date of Patent: Nov. 6, 2012

(54) METHOD AND APPARATUS FOR MANAGING DATA TRAFFIC ASSOCIATED WITH A USER ON A NETWORK

(75) Inventors: Paul J. Moran, Hemel Hempstead (GB); Christopher R. Linzell, St. Albans (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1350 days.

(21) Appl. No.: 10/179,496

(22) Filed: Jun. 25, 2002

(65) Prior Publication Data

US 2003/0163581 A1 Aug. 28, 2003

(30) Foreign Application Priority Data

Feb. 25, 2002 (GB) .................................. 0204317.2

(51) Int. Cl.
*G06F 15/173* (2006.01)
(52) U.S. Cl. ......... 709/224; 709/217; 709/225; 709/232
(58) Field of Classification Search .................. 709/224, 709/223, 226, 203, 225, 229, 232
See application file for complete search history.

(56) References Cited

U.S. PATENT DOCUMENTS

| | | | |
|---|---|---|---|
| 6,091,709 A * | 7/2000 | Harrison et al. | 370/235 |
| 6,243,359 B1 * | 6/2001 | Roy et al. | 370/230 |
| 6,269,394 B1 * | 7/2001 | Kenner et al. | 709/217 |
| 6,308,209 B1 * | 10/2001 | Lecheler | 709/224 |
| 6,324,184 B1 | 11/2001 | Hou et al. | |
| 6,615,271 B1 * | 9/2003 | Lauck et al. | 709/232 |
| 6,920,110 B2 * | 7/2005 | Roberts et al. | 370/235 |
| 7,106,756 B1 * | 9/2006 | Donovan et al. | 370/468 |
| 2001/0052003 A1 * | 12/2001 | Seki et al. | 709/219 |
| 2002/0070846 A1 * | 6/2002 | Bastian et al. | 340/5.92 |
| 2002/0085529 A1 * | 7/2002 | Koromyslichenko | 370/338 |
| 2002/0101826 A1 * | 8/2002 | Giacopelli et al. | 370/252 |
| 2002/0129143 A1 * | 9/2002 | McKinnon et al. | 709/225 |
| 2002/0129377 A1 * | 9/2002 | Cloonan et al. | 725/111 |
| 2003/0046171 A1 * | 3/2003 | Whale | 705/26 |
| 2003/0105863 A1 * | 6/2003 | Hegli et al. | 709/225 |
| 2003/0117986 A1 * | 6/2003 | Thermond et al. | 370/338 |
| 2003/0135639 A1 * | 7/2003 | Marejka et al. | 709/232 |

FOREIGN PATENT DOCUMENTS

| | | |
|---|---|---|
| EP | 1 054 529 | 11/2000 |
| EP | 1 225 743 | 7/2002 |
| GB | 2 280 574 | 2/1995 |

* cited by examiner

*Primary Examiner* — Barbara Burgess

(57) ABSTRACT

A method and processing device for controlling the communication of data associated with a user on a network 1 is described, in which the communication of data to and from a user is controlled according to user profile information. In a preferred embodiment, the user profile information is maintained in a database 9 accessible to processing devices 5 providing access to the network 1, and includes a volume allowance for a predetermined time period, a maximum transmission rate and current usage information for the user. Each time a user connects to the network 1, the method determines whether the user is within the volume allowance, and if so, permits access to the network 1. The communication of data is controlled according to the maximum transmission rate. The method may be implemented in software.

16 Claims, 2 Drawing Sheets

METHOD AND APPARATUS FOR MANAGING DATA TRAFFIC ASSOCIATED WITH A USER ON A NETWORK

BACKGROUND OF THE INVENTION

1. Field of the Invention

The present invention relates to the management and control of traffic on a data communications network.

2. Description of the Related Art

The use of data communications networks in public and semi-public environments, such as in universities, allows significant number of users access to the network simultaneously. The simultaneous access to the network by large numbers of user can generate substantial volumes of data traffic, leading to congestion on the network. This congestion can have an adverse effect on the speed of data communication. For example, use of network bandwidth by members of the public may have a detrimental effect on the speed of access to the network by users requiring access to the network in the course of their employment.

In addition, users may be able to use different workstations (for instance at different physical locations), or connect to different network access points (for instance by means of a laptop at different docking stations or at different wireless network access points), for network access. Accordingly, techniques which attempt to restrict the bandwidth for a particular network access point (which may be a network port for a wired network or a wireless access point for a wireless network) may not entirely address this problem.

It would be desirable to manage the volume of data traffic generated on the network, and the rate at which such traffic may be communicated across the network, in a manner which takes into account the user, and in particular the status of the user, as specified by the network administrator.

SUMMARY OF THE INVENTION

According to a first aspect, the present invention provides a method for controlling the communication of data associated with a user on a network, the method controlling the communication of data according to user profile information.

Preferably, the user profile information includes a volume allowance for the user, the volume allowance relating to a predefined time period.

In a preferred embodiment, the volume of data traffic associated with a user is monitored, and the volume of data traffic associated with a user for a current time period stored for use in controlling data communication.

Preferably the user profile information and the volume of data traffic associated with a user are stored in a database accessible to devices providing access to the network, the devices controlling the communication of data.

Preferably, the step of controlling the communication of data also includes controlling the rate of data communication based on the user profile information.

According to a second aspect, the present invention provides a computer readable medium including a computer program for carrying out the method of the first aspect of the present invention.

According to a third aspect, the present invention provides a processing device associated with a device providing access to a network, the processing device configured to control the communication of data associated with a user on the network according to user profile information.

The processing device of the present invention may be separate from, or integrated within, a device providing access to a network such as a port of a network switch or a wireless access point.

Further preferred features and advantages of the present invention will be apparent from the following description and accompanying claims.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
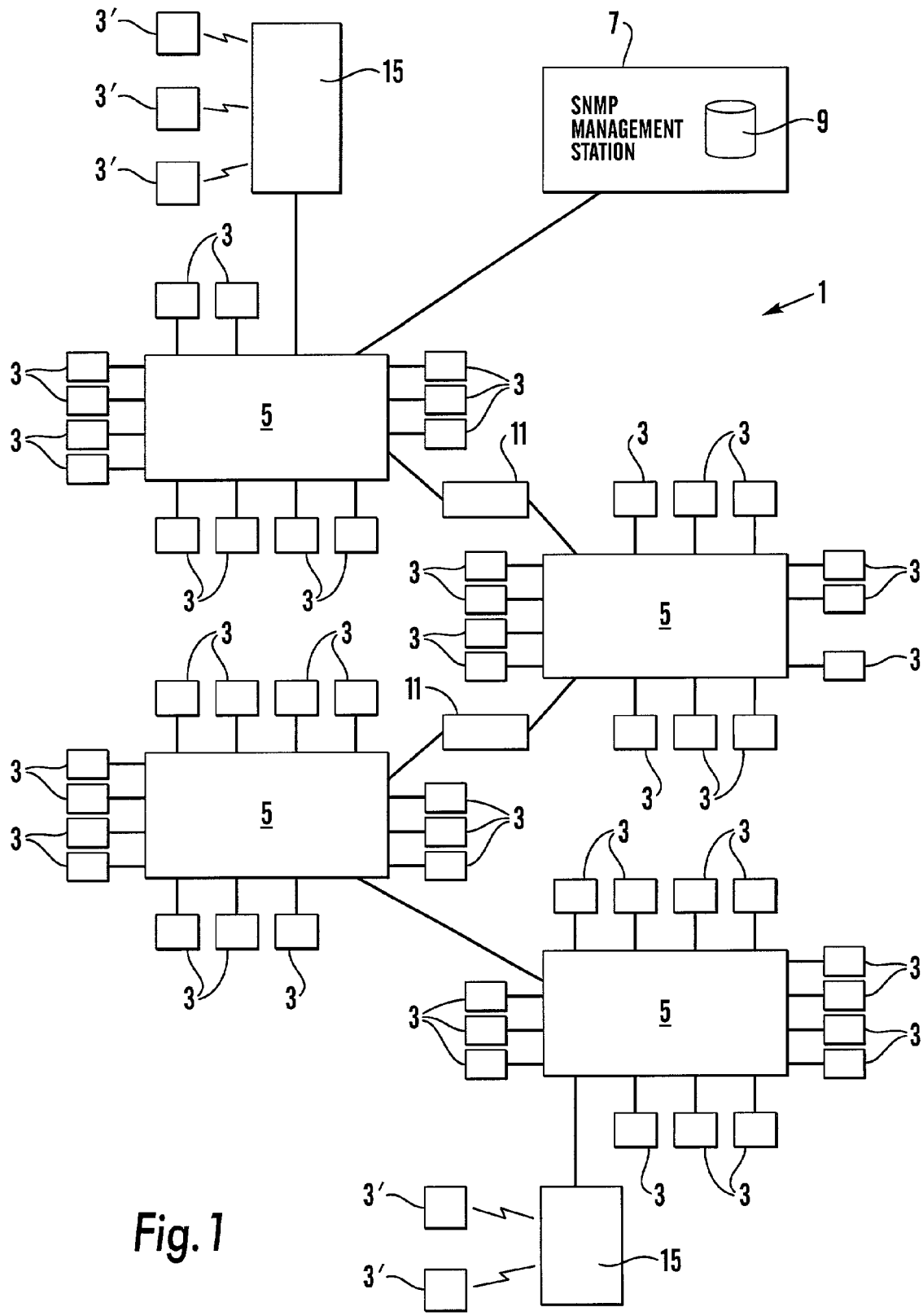
FIG. 1 is a schematic view of a part of a network according to a preferred embodiment of the present invention.

FIG. 1 shows a part of a data communications network 1 comprising a plurality of network devices connected together by media links. As is well known in the art, the network devices include interconnecting network devices, such as switches 5 and hubs, having multiple ports for the connection of other network devices including workstations (PCs) 3 to the network 1. The media links may comprise twisted pair, coaxial or fibre-optic cable. The illustrated network 1 also includes wireless network components, typical of wireless networks, in which the media links are wireless links and the interconnecting network devices, for the connection of workstations (PCs) 3' or the like to the network 1, comprise wireless access points 15.

In accordance with the illustrated embodiment, each switch 5 is an SNMP (Simple Network Management Protocol) managed device, in which the agent defined in SNMP monitors data traffic passing through the ports of the device and stores the monitored data in accordance with SNMP. The skilled person will appreciate from the following description that the present invention is not limited to use with SNMP, but rather may be implemented using other standard or proprietary protocols, including LDAP (Lightweight Directory Access Protocol), COPS (Common Open Policy Service Protocol) and RADIUS (Remote Authentication Dial-In User Service) as discussed below.

An SNMP management station 7 is connected to the network 1 and includes an SNMP manager for communicating with the managed network devices 5 in accordance with the present invention. The management station 7 is used by the network administrator and includes the necessary processing hardware and memory for operating one or more network management software applications for monitoring the network 1. In addition to, or as part of such a network management application, in accordance with the illustrated embodiment of the present invention, the management station 7 includes a database 9 for storing "user profile information".

As the skilled person will appreciate, it is not essential that the database 9 is associated with the management station 7, but rather the database 9 may be associated with any appropriate workstation, server or other processing device permanently connected to the network 1.

In accordance with the illustrated embodiment, database 9 is created using any suitable conventional technique and the user profile information is typically entered in the database 9 by the network administrator for each new user, and may be changed as desired.

The user profile information comprises the following information for each user:
User ID;
Maximum Data Transmission Rate "MaxRate" (in Mbps);
Maximum Data Volume "MaxVolume" (in Mbytes) per Time Period "AccPeriod" (in seconds/hours/days/months);
Start and/or Finishing Time "Start/FinishTime" for the Time Period.

In addition to the user profile information, as explained below, the database stores, for each user:
Current Data Volume "ActualVolume" (in Mbytes) for the Current Time Period "AccPeriod" (in seconds/hours/days/weeks).

Accordingly, each user has a data volume allowance, represented by MaxVolume" for a certain time period "AccPeriod", the time period starting/finishing at the "Start/FinishTime". For example, a high status user may have an allowance of 2000 Mbytes per day (the Start Time for each time period being 00.01 hours every day). A low status user may have an allowance of 200 Mbytes per week (the Start Time for each time period being 00.01 every Monday).

To control the volume of data traffic generated by a user, as described in detail below, the database 9 maintains a record of the volume of data traffic generated by a user in the Current Time Period, as the "ActualVolume", in order to ensure that a user does not exceed his or her volume allowance "MaxVolume" in the time period.

Moreover, the data transmission rate has an upper limit for each user, represented by "MaxRate". Thus, a high status user may have a maximum transmission rate of 1000 Mbps, whereas a low status user may be limited to transmission rates of 10 Mbps, even if the network device used for network access is capable of higher transmission speeds.

The data transmission rate for a user is controlled according to the upper limit set for the user in the database "MaxRate".

A method of controlling data communication, associated with a user, on the network 1 of FIG. 1, in accordance with a first preferred embodiment of the present invention will now be described with reference to FIG. 2. Methods according to other embodiments of the present invention will also be described, which may be implemented using protocols other than SNMP and in conjunction with other networks.

Figure 2:
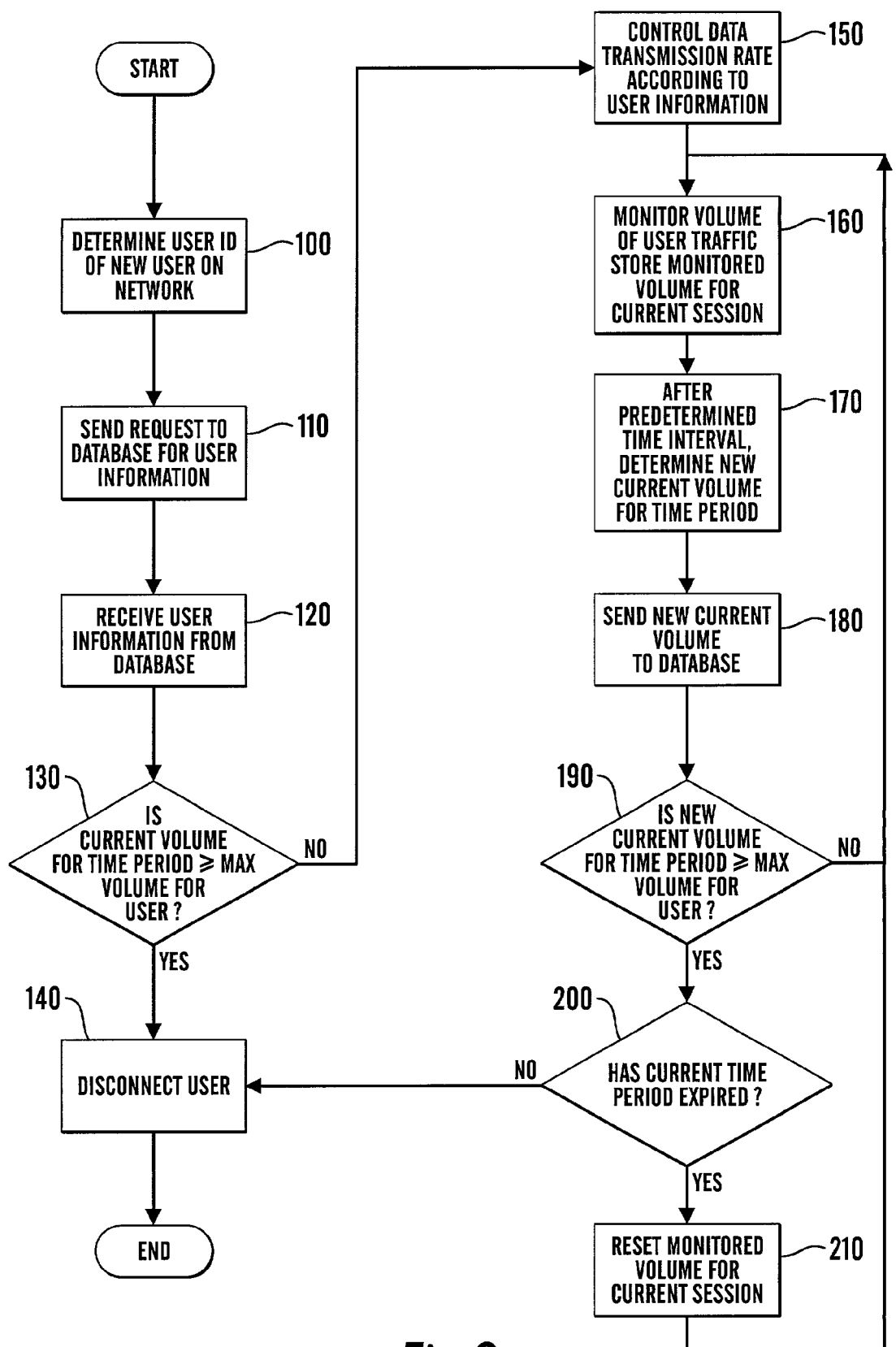
FIG. 2 is a flow diagram illustrating a method, implemented in one or more network devices providing access to the network of FIG. 1, in accordance with a preferred embodiment of the present invention.

FIG. 2 illustrates a method in accordance with a first preferred embodiment of the present invention. Except as otherwise indicated below, the method of this embodiment is implemented in each managed network device 5, and each wireless access point 15, as embedded software. It will be appreciated that the method could be implemented in other forms, including hardware.

The method begins each time a user logs on to the network 1 using any port of any managed network device 5, and continues during the connection. Accordingly, the method typically is performed simultaneously for a plurality of different ports of the network device 5 and for a plurality of different users.

Step 100 determines the identity of the new user ("user ID"). The user ID can be determined using any conventional technique consistent with the network/network operating system. For example, the username entered by the new user during the login sequence of the operating system may be used. In a second preferred embodiment, described in more detail below, the user ID can be determined using the IEEE 802.1X standard.

Step 110 sends a request to the database 9 for user profile information for the user. In particular, the request is an SNMP request for retrieval of the "MaxRate"; "MaxVolume"; "Start/FinishTime"; "AccPeriod" and "ActualVolume" for the user ID specified in the request, as determined at step 100.

Step 120 receives the user profile information, requested at step 110, from the database 9 and may store this data in memory.

Step 130 compares the ActualVolume with the MaxVolume to determine whether the ActualVolume exceeds the MaxVolume. If step 130 determines that ActualVolume is greater than or equal to MaxVolume, the user has already reached his or her data volume allowance for the time period, and step 140 disconnects the user from the network. When disconnecting the user, an appropriate message, explaining the reason for disconnection, is preferably sent to the user for display, and a message is also preferably sent to the network management station 7 for inclusion in network management statistical data for use by the network administrator.

Alternatively, if step 130 determines that ActualVolume is less than MaxVolume, the user is within his or her data volume allowance for the time period and access to the network is permitted at data rates within the user's allowance as controlled in step 150.

Step 150 determines and controls the data/transmission rate for the user. The data rate must be less than or equal to MaxRate for the user, and may be determined and controlled using one or more conventional techniques.

For example, step 150 may use auto negotiation, in accordance with the IEEE 802.3x standard or equivalent standards on other media, to determine a fastest transmission rate for the network equipment being employed by the user. The fastest rate determined by auto negotiation may then be used as the transmission rate provided it is less than or equal to MaxRate (if the fastest data rate determined by auto negotiation is greater than MaxRate then the transmission rate is MaxRate by default).

Step 150 may alternatively, or in addition, control the data transmission rate using the method described in the applicant's co pending UK Patent Application No 0030600.1. In the method described in this co pending application the flow of traffic though a port of a network switch is monitored and controlled by a token bucket system. In particular, in a full duplex system, two token buckets are used, one to control the rate of outgoing traffic and the other to control the rate of incoming traffic. Each token bucket is configured with a threshold. In the case of the token bucket controlling outgoing traffic, when the threshold is exceeded, the rate at which data is output from the transmit queue of the port is reduced, thus reducing the transmission rate. In the case of the token bucket controlling incoming data, when the threshold is exceeded the port transmits "pause" frames in accordance with IEEE 802.3 Standard to reduce the rate of reception of data at the port. Accordingly, this method may be implemented in the method of the present invention, the thresholds of the token buckets being set in accordance with the user profile, and in particular in accordance with the MaxRate for the user.

Step 160 then monitors the volume of the traffic sent to and from the user, and stores in memory a monitored data volume for the Current Session ("SessionVolume"), corresponding to the data volume monitored since the user logged on to the network 1 in the Current Session at step 100. In accordance with conventional techniques, the monitoring of the data volume is preferably performed in hardware.

After a predetermined time interval (e.g. 30 minutes), step 170 determines the new Current Volume (new ActualVolume) for the current time period by adding the SessionVolume stored in memory to the ActualVolume retrieved from the database at step 120.

Step 180 sends the "SessionVolume" (or alternatively the determined new ActualVolume) to the database 9 for updating the value for ActualVolume associated with the user ID stored in the database 9. (Note, if the SessionVolume is sent, the database performs the calculation to determine the new ActualVolume).

Step 190 compares the new ActualVolume, determined at step 170, with the MaxVolume to determine whether the new ActualVolume exceeds the MaxVolume.

If step 190 determines that the new ActualVolume is less than MaxVolume, the user is still within his or her data volume allowance for the time period and monitoring continues at step 160.

Alternatively, if step 190 determines that new ActualVolume is greater than or equal to MaxVolume, the user has now reached his or her data volume allowance for the Current Time Period (i.e. the time period that was current at the start of the session at step 100).

However, before disconnecting the user, step 200 considers whether the Current Time Period has expired. This can be determined by considering the "Start/FinishTime" and the "AccPeriod" for the user, retrieved at step 120.

If step 200 determines that the Current Time Period has not expired, then step 140 disconnects the user from the network 1. When disconnecting the user, an appropriate message, explaining the reason for disconnection, is preferably sent to the user for display, and, in accordance with the preferred embodiment, a message is also sent to the network management station 7 indicating that the user has been disconnected and Current Session has ended (this latter message termed "end of session notification").

Alternatively, if step 200 determines that the Current Time Period has expired, then step 210 resets the monitored value in memory to zero, and the ActualVolume to zero and monitoring continues at step 160.

It will be appreciated that steps 200 and 210 may be performed periodically at a different stage in the program sequence. For instance these steps may be performed at more frequent periodic intervals than step 170 (e.g. every 1 to 5 minutes) so that the monitored volume can be reset and monitoring can continue as soon as a new Current Time Period for the user begins. Alternatively, since the network management station 7 may automatically reset the ActualVolume for a user in the database 9 as soon as a new Start/Finish Time is reached, and may monitor the Current Session of the user in response to the request at step 110, then, in the absence of an "end of session" notification at step 140, the management station 7 may send a request to the network port (or access point) to reset the monitored volume and the ActualVolume to zero at the same time as resetting the ActualVolume in the database 9.

It will be appreciated that when a user logs off the network 1 at the end of a session, whether or not his or her volume allowance has been reached, the monitored volume is send to database 9 together with an "end of session" notification.

In addition, after step 140 disconnects the user from the network 1, or when the user logs off, the port of the network device 5 (or wireless network access point 15 or other equivalent network access point) may reconfigure the auto negotiation mechanisms or other bandwidth, data rate or data volume control mechanisms to appropriate default or previously configured settings until a new user logs on.

Whilst in the described embodiment, the step of determining whether the Current Volume (ActualVolume/new Current Volume) exceeds the user's permitted volume (MaxVolume) is performed in the managed network device 5 (or wireless network access point 15) at step 130 or step 190, it will be appreciated that in other embodiments this determination could be performed in the management station 7 or other processor associated with database 9. In this case, the determination of the new Current Volume at step 170 may be performed in the management station 7, following receipt of the monitored volume for the current session from the managed network device 5, sent at step 180.

As previously mentioned, the present invention is not limited to use with SNMP. For instance, protocols including RADIUS, LDAP and COPS may be used. The method described in relation to FIG. 2 will be adapted according to the implementing protocol.

For example, in a second preferred embodiment the IEEE 802.1X standard is used in conjunction with RADIUS. In this embodiment, step 100 uses the IEEE 802.1X standard authentication sequence to determine the identity of the new user. Specifically, in the authentication sequence a new user logging on to a network is invited to enter a username (which is the user ID in the present invention) and password. The username and password is authenticated by an authentication server on the network before access is allowed. If the user is authenticated, in accordance with the IEEE 802.1X standard, the authentication server sends "attributes data" detailing the constraints and conditions for access to the network by the user.

Accordingly, in this second preferred embodiment, the authentication server also includes the database, which stores the user profile information. The user profile information is automatically included with the data sent to the port or wireless access point to which the user is connecting with the authentication attributes data. The additional data may be incorporated with the attributes data using the RADIUS protocol. It will be appreciated that in this embodiment, steps 100, 110 and 130 of the method of FIG. 2 are replaced by the authentication sequence, it being unnecessary to send a separate request for user information at step 110.

As will be apparent from the above description, the present invention advantageously permits the dynamic allocation of bandwidth to a user, irrespective of the location of the user, upon connecting to the network, according to the profile of the user. Thus, high priority users may be given high volume and high maximum data rate allowances in order to guarantee the allocation of bandwidth required.

As the skilled person will appreciate, various modifications and changes may be made to the described embodiments. It is intended to include all such variations, modifications and equivalents which fall within the spirit and scope of the present invention, as defined in the accompanying claims.

The invention claimed is:

1. A method for controlling the communication of user data associated, at a plurality of network switches on a network, with a user on the network, the method comprising:
   in at least one of the plurality of network switches,
      accessing user profile information of the user, wherein the user profile information comprises at least a data volume allowance for the user;
      monitoring a volume of data used by the user over the network regardless of which of a plurality of devices the user uses to access the at least one of the plurality of network switches;
      controlling the communication of user data on the network by permitting said communication of user data through the plurality of switches while the volume of data used by the user is within the data volume allowance for the user, and preventing said communication of user data if the volume of data used by the user reaches or exceeds the data volume allowance for the user.

2. A method as claimed in claim 1, in which the method further comprises obtaining current usage information for the user from an external database; comparing the current usage information with the volume allowance for the user, and controlling the communication of user data according to the result of the comparison.

3. A method as claimed in claim 2, in which the volume allowance is a data volume for the user in a time period; the current usage information includes a current volume for the user, the current volume corresponding to the volume of data associated with the user communicated on the network since the start of a current said time period, and the step of comparing comprises comparing the volume allowance with the current volume for the user.

4. A method as claimed in claim 3, in which, if the step of comparing determines that the current volume is greater than or equal to the volume allowance, the step of controlling comprises preventing data communication by the user until said current time period has expired.

5. A method as claimed in claim 4, in which, if the step of comparing determines that the current volume is less than the volume allowance, the step of controlling comprises permitting the communication of user data associated with the user whilst controlling a data rate.

6. A method as claimed in claim 3, in which, if the step of comparing determines that the current volume is less than the volume allowance, the step of controlling comprises permitting the communication of user data associated with the user whilst controlling a data rate.

7. A method as claimed in claim 6, the step of controlling the data rate comprises controlling the data rate according to a maximum data rate.

8. A method as claimed in claim 6, further comprising: monitoring, in the at least one of the plurality of network switches, the volume of data associated with the user communicated on the network.

9. A method as claimed in claim 8, further comprising: periodically determining a new current volume for the user; comparing the new current volume with the volume allowance for the user, and controlling the communication of user data based upon the comparison.

10. A method as claimed in claim 9, wherein the volume allowance, the current volume, the data rate, the maximum data rate, and the time period are stored in the external database; and wherein the at least one of the plurality of network switches is configured to communicate with the external database.

11. A method as claimed in claim 10, wherein the at least one of the plurality of network switches is configured to perform the step of monitoring, the method further comprising periodically sending the monitored volume of data for the user to the database for updating the current volume for the user.

12. A network switch associated with a device providing access to a user to a network, the network switch being configured to access user profile information of a user of the device, wherein the user profile information comprises at least a data volume allowance for the user, to monitor a volume of data used by the user over the network regardless of which of a plurality of devices the user uses to access the network switch, and to control the communication of data associated with the user at a plurality of points on the network, wherein the network switch prevents the user from accessing the network when the volume of data used by the user reaches or exceeds the data volume allowance for the user.

13. A method for controlling, at a plurality of points on a network, the communication of user data associated with a user on the network, the method comprising:
in at least one hub on the network,
accessing user profile information of the user, wherein the user profile information comprises at least a data volume allowance for the user;
monitoring a volume of data used by the user over the network regardless of which of a plurality of devices the user uses to access the at least one hub;
controlling the communication of user data on the network by permitting said communication of user data through the at least one hub while the volume of data used by the user is within the data volume allowance for the user, and
preventing said communication of user data if the volume of data used by the user reaches or exceeds the data volume allowance.

14. A method for controlling, at a plurality of points on a network, the communication of user data associated with a user on the network, the method comprising:
in at least one wireless access point on the network,
accessing user profile information of the user, wherein the user profile information comprises at least a data volume allowance for the user;
monitoring a volume of data used by the user over the network regardless of which of a plurality of devices the user uses to access the at least one wireless access point;
controlling the communication of user data at a plurality of points on the network by permitting said communication of user data through the at least one wireless access point while the volume of data used by the user is within a data volume allowance for the user, and
preventing said communication of user data if the volume of data used by the user reaches or exceeds the data volume allowance.

15. A network hub associated with a device providing access to a network, the network hub being configured to access user profile information of a user of the device, wherein the user profile information comprises at least a data volume allowance for the user, to monitor a volume of data used by the user over the network regardless of which of a plurality of devices the user uses to access the network hub, and to control the communication of data associated with the user at a plurality of points on the network, wherein the network hub prevents a user from accessing the network when the volume of data used by the user reaches or exceeds the data value allowance for the user.

16. A wireless access point associated with a device providing access to a network, the wireless access point being configured to access user profile information of a user of the device, wherein the user profile information comprises at least a data volume allowance for the user, to monitor a volume of data used by the user over the network regardless of which of a plurality of devices the user uses to access the wireless access point, and to control the communication of data associated with a user at a plurality of points on the network, wherein the wireless access point prevents a user from accessing the network when the volume of data used by the user reaches or exceeds the data volume allowance.

* * * * *